(12) United States Patent
Falossi

(10) Patent No.: US 11,541,688 B2
(45) Date of Patent: Jan. 3, 2023

(54) WHEEL HUB ASSEMBLY PROVIDED WITH PIEZOELECTRIC SPACERS

(71) Applicant: Aktiebolaget SKF, Gothenburg (SE)

(72) Inventor: Marco Falossi, San Raffaele Cimena (IT)

(73) Assignee: AKTIEBOLAGET SKF

( * ) Notice: Subject to any disclaimer, the term of this patent is extended or adjusted under 35 U.S.C. 154(b) by 873 days.

(21) Appl. No.: 16/394,255

(22) Filed: Apr. 25, 2019

(65) Prior Publication Data
US 2019/0344617 A1 Nov. 14, 2019

(30) Foreign Application Priority Data

May 10, 2018 (IT) .......................... 102018000005211

(51) Int. Cl.
*B60B 27/00* (2006.01)
*H02N 2/00* (2006.01)

(52) U.S. Cl.
CPC ........ *B60B 27/001* (2013.01); *B60B 27/0015* (2013.01); *H02N 2/001* (2013.01); *H02N 2/0055* (2013.01); *B60B 2900/131* (2013.01); *B60B 2900/133* (2013.01)

(58) Field of Classification Search
CPC .............. B60B 27/001; B60B 27/0015; B60B 27/0084; B60B 27/0005; B60B 2900/131; B60B 2900/133; F16C 19/527; F16C 19/186; F16C 27/04; F16C 2202/36; F16C 2326/02; G01M 13/045; H02N 2/001; H02N 2/0055; H02N 2/14
See application file for complete search history.

(56) References Cited

U.S. PATENT DOCUMENTS

| 5,221,146 A | 6/1993 | Maruyama | |
|---|---|---|---|
| 5,584,447 A * | 12/1996 | Pla | B64D 33/06 381/345 |
| 6,712,518 B2 * | 3/2004 | Takamizawa | G11B 19/2009 384/450 |
| 7,497,131 B2 * | 3/2009 | Sentoku | F16C 19/522 73/862.322 |

(Continued)

FOREIGN PATENT DOCUMENTS

| DE | 102005007985 | 8/2006 |
|---|---|---|
| DE | 102015216611 | 8/2006 |
| EP | 1659385 | 5/2006 |

OTHER PUBLICATIONS

International Search Report for Italy Patent Application No. 102018000005211 dated Feb. 22, 2019.

*Primary Examiner* — Emily P Pham
(74) *Attorney, Agent, or Firm* — Reed Smith LLP

(57) ABSTRACT

A wheel hub assembly for motor vehicles, having a rotatable hub, a bearing unit in turn comprising a radially outer ring, a radially inner ring and a plurality of rolling bodies. The axial interface between the wheel hub assembly and a knuckle of a motor vehicle suspension provides at least one piezoelectric spacer configured to detect first mechanical vibrations coming from the components of the wheel hub assembly and to implement corrective action consisting of second mechanical vibrations of almost equal amplitude but with opposite direction and phase, so that the resultant of the first and second mechanical vibrations is close to zero.

8 Claims, 2 Drawing Sheets

(56) References Cited

U.S. PATENT DOCUMENTS

| | | | |
|---|---|---|---|
| 2002/0124650 A1* | 9/2002 | Matsumoto | G01M 1/225 73/460 |
| 2005/0140357 A1* | 6/2005 | Takizawa | G01P 3/446 324/174 |
| 2012/0140972 A1* | 6/2012 | Akino | H04R 3/04 381/355 |
| 2019/0322133 A1* | 10/2019 | Lamboglia | F16C 19/522 |

* cited by examiner

WHEEL HUB ASSEMBLY PROVIDED WITH PIEZOELECTRIC SPACERS

CROSS-REFERENCE

This application claims priority to Italian patent application no. 102018000005211 filed on May 10, 2018, the contents of which are fully incorporated herein by reference.

TECHNOLOGICAL FIELD

The present invention relates to a wheel hub assembly comprising a bearing unit arranged radially between a hub connected to a part of a motor-vehicle wheel and a part, for example the suspension knuckle, connected to the motor-vehicle body. The bearing unit comprises at least one inner ring and at least one outer ring between which at least one row of rolling bodies is arranged. The wheel hub assembly is also provided with one or more piezoelectric spacers for actively controlling vibrations and noise transmitted from the wheel of a motor vehicle to the body of the motor vehicle.

The present invention is suitable in particular, although not exclusively, for the wheel hub assemblies of motor vehicles, the assemblies being provided with a rolling bearing. These applications comprise both the case where the outer ring of the bearing is rotating, while the inner ring of the bearing is fixed, and the opposite case where the inner ring rotates and the outer ring is fixed. The invention is also suitable for any type of rolling body (balls, rollers, tapered rollers, etc.).

BACKGROUND

Wheel hub assemblies essentially have the function of rotatably supporting the driving wheels or the non-driving wheels operated by an axle of the motor vehicle and are well-known to the person skilled in the art.

It is also known that noise and vibration control is one of the main characteristics for ensuring the comfort in motor vehicles. The sources of noise and vibrations perceived inside the motor vehicle are many, but the main ones may be identified as being the engine, the movement transmission assembly and the road surface.

Nowadays the noise produced by the engine is becoming less and less obvious and cannot be heard inside the motor vehicle in most driving conditions. With the increasing electrification of the various components in motor vehicles, the other noise sources associated with the movement transmission system have also practically disappeared. Therefore, the main source of noise and vibration remains the noise produced by the rolling movement of the tires on the road surface. In particular, the higher frequency vibrations due mainly to the roughness of the road surfaces are not effectively dampened by the suspension system of the motor vehicle and may contribute greatly to the noise levels inside the motor vehicle.

In fact, the suspension systems currently used may filter only low-frequency vibration components, and therefore the vibrations which are within the audible frequency spectrum may normally reach the motor vehicle passenger compartment and eventually be converted into noise depending on the frequency spectrum and the efficiency of the surfaces of the vibrating structures.

One way to solve the problem is to interrupt the vibration propagation path. This is not easy however: in fact, since a suitable mechanical performance is required for the structures of the suspension system, it is not possible to use highly resilient materials which are effective in the audible frequency range.

There therefore exists the need to design a wheel hub assembly provided with an innovative system which is able to prevent the propagation of vibrations and which do not have the aforementioned drawbacks.

SUMMARY

The object of the present invention is to provide a wheel hub assembly which has characteristics able to compensate for the vibrations which occur, in particular, during the operation of the wheel hub assembly and are due essentially to the roughness of the road surface.

The approach adopted by the present invention is that of introducing a system for actively controlling the vibrations. This type of system operates using the principle of wave interference. If a sensor reads a signal in the form of an electromagnetic wave, an actuator may generate an electromagnetic wave of equal amplitude, but with opposite direction and phase, so that the sum of the waves is as close as possible to zero.

This principle may be employed, for example, at the interface between the radially outer ring and knuckle of the suspension, by means of piezoelectric spacers which, by taking advantage of the characteristics typical of piezoelectric materials, act simultaneously both as sensors and as actuators. A control unit for implementing the most appropriate feedback logic is necessary. The piezoelectric actuators must be positioned at each interface between the radially outer ring and the suspension knuckle, in order to avoid any direct contact between the two sides of the structure.

The invention therefore consists in inserting piezoelectric spacers at the interface between the wheel hub assembly and the suspension knuckle. The spacers are used to measure the vibrations and to introduce an opposing force which implements an active control of the vibrations. In this way propagation of the mechanical vibrations mentioned towards the inside of the motor vehicle is prevented. In other words, the piezoelectric spacers detect first mechanical vibrations coming from the components of the wheel hub assembly and implement corrective action consisting of second mechanical vibrations of practically the same amplitude, but with opposite direction and phase, so that the resultant of the first and second mechanical vibrations is close to zero.

Therefore, according to the present invention, a wheel hub assembly provided with at least one piezoelectric spacer having the characteristic features indicated in the attached independent claim is provided.

Further preferred and/or particularly advantageous embodiments of the invention are described in accordance with the characteristic features indicated in the attached dependent claims.

BRIEF DESCRIPTION OF THE DRAWINGS

The invention will now be described with reference to the accompanying drawings which illustrate a non-limiting example of embodiment thereof, in which.

DETAILED DESCRIPTION

Figure 1:
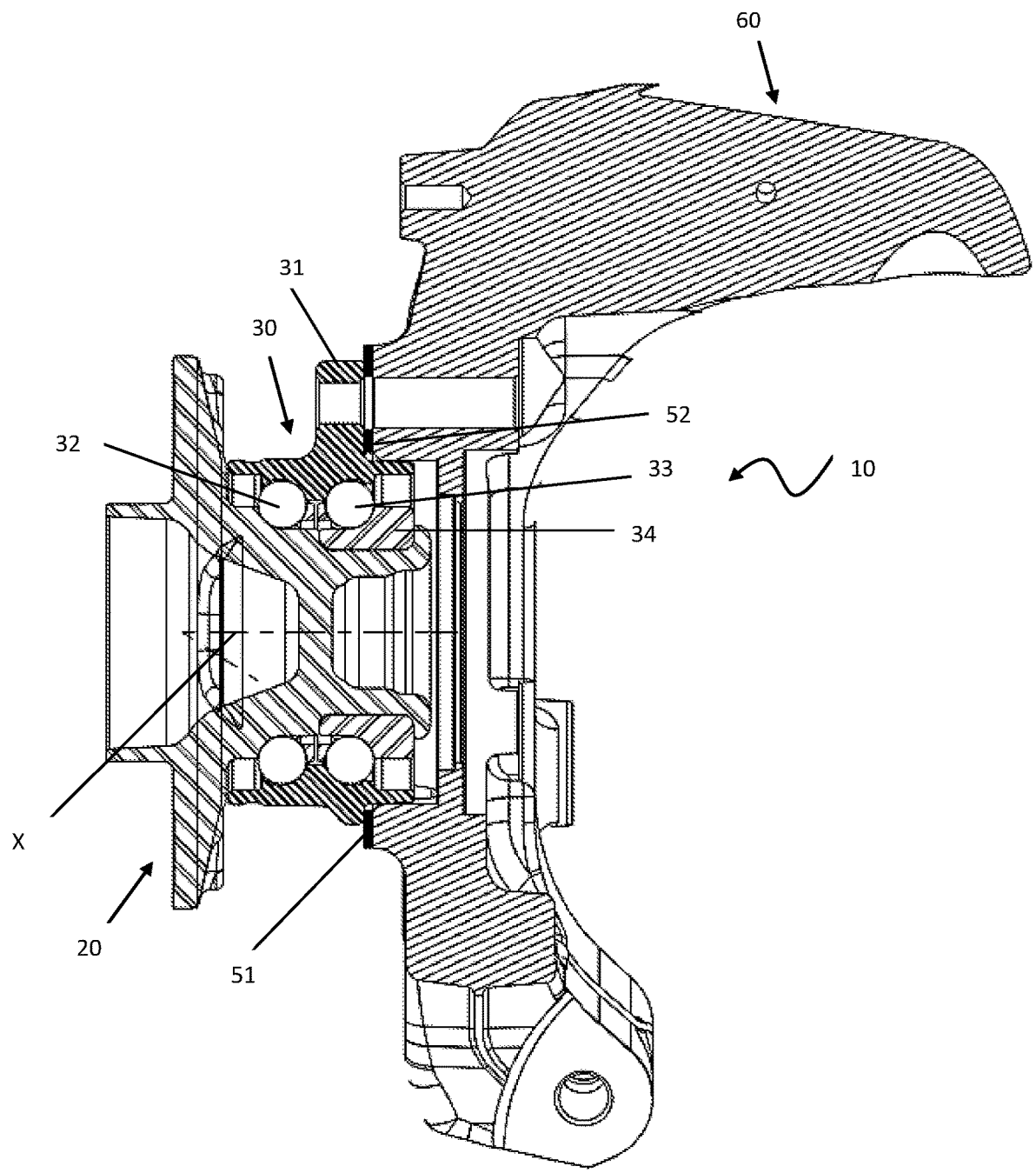
FIG. 1 is a cross-section through a wheel hub assembly according to an embodiment of the present invention.

With reference now to the aforementioned figures, a wheel hub assembly according to a preferred embodiment of the invention is denoted overall by 10. As mentioned in the preamble, the invention is applicable not only to the configuration described below, but more generally to any wheel hub assembly for motor vehicles.

The unit 10 comprises a hub 20 which is preferably, but not necessarily, rotatable and a bearing unit 30. The hub 20 is configured to assume also the function of an inner rolling ring of the bearing. In the whole of the present description and the claims, the terms and expressions indicating positions and orientations such as "radial" and "axial" are understood as referring to the central axis of rotation X of the bearing unit 30. Expressions such as "axially outer" and "axially inner" refer instead to the assembled condition and, in the specific case, preferably refer to a wheel side and, respectively, to a side opposite side to the wheel side.

The bearing unit 30 comprises a radially outer ring 31 which is preferably, but not necessarily, stationary and provided with a flange 31a for joining together with a knuckle 60 of the motor vehicle suspension, and respective radially outer raceways. The bearing unit 30 comprises furthermore at least one rotatable radially outer ring 20, 34 provided with respective radially inner raceways and two rows of rolling bodies, 32,33, in this example balls. The axially outer row of rolling bodies 32 is arranged between the radially outer ring 31 and the hub 20 with the function of a radially inner ring, while the axially inner row of rolling bodies 33 is arranged between the radially outer ring 31 and the radially inner ring 34. For the sake of easier illustration, the reference numbers 32, 33 will be used to identify both the single balls and the row of balls and in particular 32 will indicate the axially outer row of balls or single ball, while 33 will indicate the axially inner row of balls or single ball. Again, for the sake of simplicity, the term "ball" may be used by way of example in the present description and in the attached drawings instead of the more generic term "rolling body" (and likewise the same reference numbers will also be used). It will be understood always that, instead of balls, any other rolling body (for example, rollers, tapered rollers, needle rollers, etc.) may be used.

According to a preferred embodiment of the invention, which is not shown but may be easily deduced from that described above, the radially outer ring 31 could also be a rotating ring, while the radially inner ring could also be a stationary ring.

The rolling bodies of the rows 32, 33 are kept in position by corresponding cages 39, 40.

The hub 20 defines at its axially inner end a rolled edge 22 which is configured to preload axially the inner ring 34. The hub 20 also has an axially outer flange portion 23.

Figure 2:
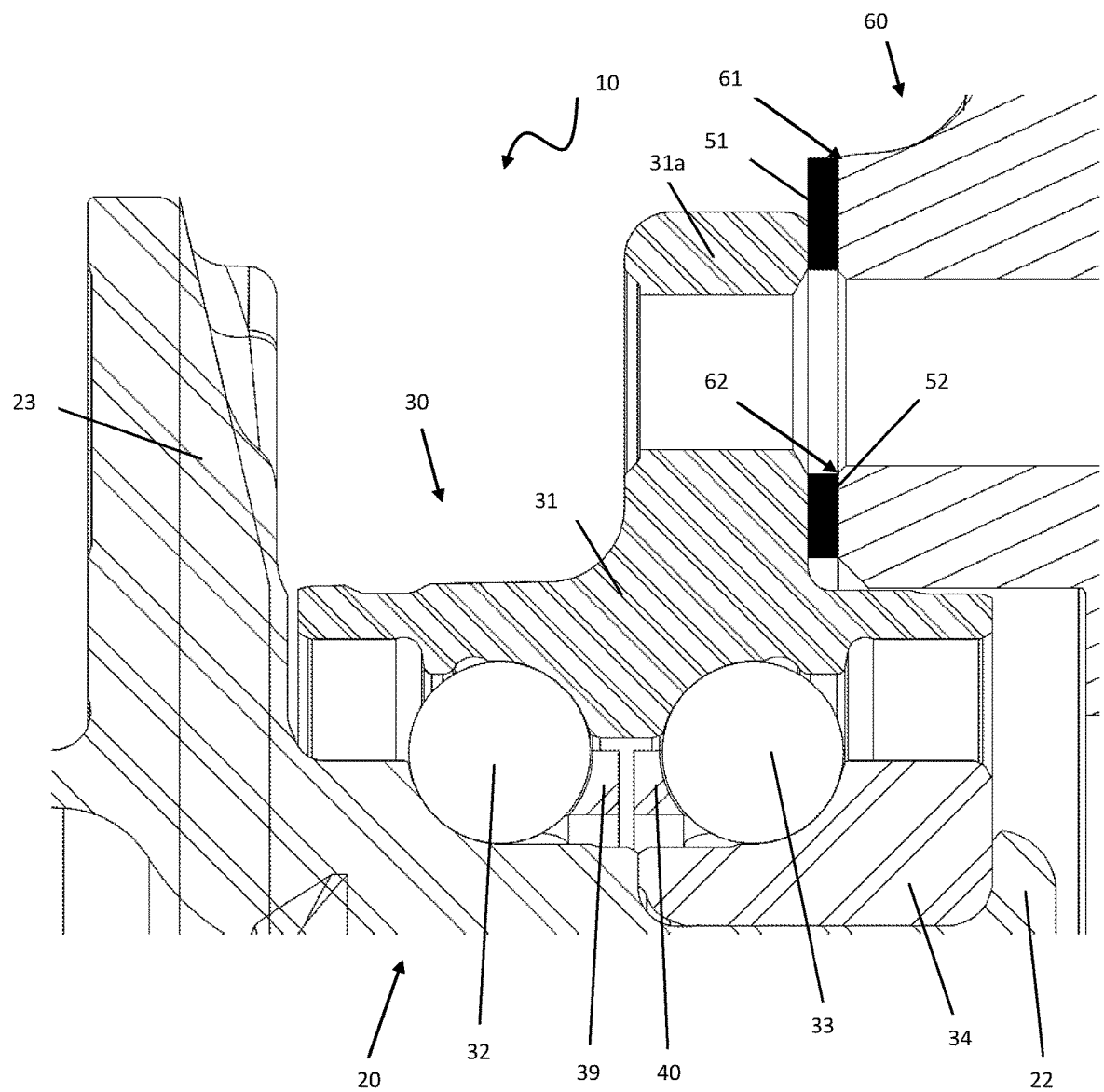
FIG. 2 is a detail on a larger scale of FIG. 1.

The wheel hub assembly 10 is provided with at least one piezoelectric spacer 51, 52 for actively controlling the vibrations. The piezoelectric spacer may be in the form of a washer, a solid disc, a plate or in any case have any form suitable for creating a discontinuity in the interface in which they are positioned. With particular reference to FIG. 2 it may be noted how the piezoelectric spacers 51, 52 are positioned at the interface between the flange 31a of the radially outer ring 31 with a front surface 61, 62 of the knuckle 60 of the motor-vehicle suspension. The drawings provided show a preferred arrangement for actively controlling the vibration by means of piezoelectric spacers. Other arrangements may be defined depending on the design of the interface between the wheel hub assembly and the suspension knuckle, based on the same concept of piezoelectric devices arranged in between at the interface.

According to the invention it is possible to interrupt the transmission of mechanical vibrations along the structures of the suspension system of the motor vehicle at the interface between the wheel hub assembly (in the example described the radially outer ring) and the suspension knuckle. A discontinuity is thereby created by the arrangement, in between, of a layer of piezoelectric material which has the function of actively controlling the vibrations. The piezoelectric spacer measures the waveform of the vibrations and the implements a signal of almost equal amplitude but with opposite direction and phase, so that a resultant signal is almost equal to zero. Therefore, the mechanical vibrations from all the components upstream of these piezoelectric spacers may be dampened and no longer reach the passenger compartment of the motor vehicle, thus avoiding the potential generation of noise which may be perceived by the occupants of the vehicle.

Preferably, the invention may be realized by making advantageous use of two important characteristics of the piezoelectric devices.

The first characteristic is the auto-detection capacity which is one of the main recent successes in the sector of piezoelectric actuators. In fact, the piezoelectric spacer reacts to a mechanical input, for example a mechanical vibration, producing an electric voltage at its output. This is referred to as "direct piezoelectric effect" and in this mode the piezoelectric spacer operates as a sensor. Vice versa, an electrical input, for example an electric voltage, produces a mechanical output, for example a deformation. This is referred to as "inverse piezoelectric effect" and in this mode the piezoelectric spacer operates as an actuator. The combination of the two effects may be obtained by dividing the piezoelectric spacer into two parts, one part used for detection and one part used for actuation. Alternatively, it is possible to model the behavior of the device. In this second case—which is preferred to the first case in this application because the whole surface may be used for actuation—the model should be constructed so that there is a sufficient distance between the actuation part and the detection part. Namely, the two parts must not influence each other.

The second characteristic is the possibility of producing a mechanical output along a shearing direction. In this way, the piezoelectric materials, by generating a mechanical output along a shearing direction, allow the specific arrangement shown in the figures to act along the main vibration direction which is the vertical direction, considering that the main disturbance factors acting on the wheel result from the irregularity of the road surface. Since the arrangement of the material described in the figures has the form of a spacer arranged between the flange 31a of the radially outer ring 31 and the knuckle 60, the main direction of the vibration should be nearly parallel to a main plane (vertical plane, in the attached figures) of this element, namely parallel to the axial interface between the wheel hub assembly 10 and the knuckle 60 of the suspension. While a more conventional piezoelectric actuator which functions along the main directions of the stresses (expansion/compression) will be able to react only to very small vibrating components (those along an axial direction), according to the present invention the piezoelectric actuator made of material which functions with shearing actions is instead able to overcome this problem since, in the arrangement proposed, it will be able to act in the same direction as the main vibration disturbance, namely along an axis which is vertical with respect to the wheel hub assembly and the motor vehicle itself.

The wheel hub assembly and in particular the piezoelectric spacers are controlled by means of a special control unit, not shown, which has the following main functions:

detection of the control signal transmitted by the signal acquisition portion of the piezoelectric spacer;

implementation of the control logic;

actuation of the actuating portion of the piezoelectric spacer.

The main advantage of the present invention is the reduction in the noise component which is generated by the road surface and transmitted via the tires and is perceived inside the motor vehicle passenger compartment. The piezoelectric spacers may also be used, when functioning as sensors, to measure some components of the forces exerted on the wheel.

In addition to the embodiments of the invention, as described above, it is to be understood that numerous further variants are possible. It must also be understood that the embodiments are only examples and do not limit the subject of the invention, nor its applications, nor its possible configurations. On the contrary, although the description provided above enables the person skilled in the art to implement the present invention at least in one of its examples of configuration, it must be understood that numerous variations of the components described are feasible, without thereby departing from the scope of the invention, as defined in the accompanying claims, interpreted literally and/or in accordance with their legal equivalents.

What is claimed is:

1. A wheel hub assembly for mounting to a knuckle, comprising:
    a bearing unit comprising a radially outer ring and a radially inner ring;
    a plurality of rolling bodies disposed between the radially inner ring and the radially outer ring;
    at least one piezoelectric spacer disposed on a surface of the radially outer ring such that, in an assembled condition with the knuckle, the at least one piezoelectric spacer contacts a surface of the knuckle,
    wherein,
        the at least one piezoelectric spacer is configured to detect a first mechanical vibration of the radially outer ring implement a corrective action, and
        the corrective action comprises a second mechanical vibration of equal amplitude and opposite direction and opposite phase.

2. The wheel hub assembly according to claim 1, wherein the at least one piezoelectric spacer is positioned at an interface between a flange of the radially outer ring and a front surface of the knuckle.

3. The wheel hub assembly according to claim 1, wherein the at least one piezoelectric spacer is divided into a first detection part for detecting the first mechanical vibrations and a second actuator portion for implementing the corrective actions in response to the first mechanical vibrations.

4. The wheel hub assembly according to claim 1, wherein,
    the at least one piezoelectric spacer is configured to allow actuation along a contact surface with the axial interface between the radially outer ring and the knuckle, and
    the at least one piezoelectric spacer is configured to be modeled such that there is a sufficient distance between the parameters related to the implementation of the corrective actions and the parameters relating to the detection of the first mechanical vibrations.

5. The wheel hub assembly according to claim 1, wherein the at least one piezoelectric spacer is configured to implement the corrective actions in a direction parallel to the axial interface between the radially outer ring and the knuckle.

6. The wheel hub assembly according to claim 1, wherein the at least one piezoelectric spacer is shaped as a washer or a solid disc or a plate.

7. The wheel hub assembly according to claim 1, wherein the at least one piezoelectric spacer is configured to be operated by a control unit that detects a signal of the first mechanical vibrations transmitted by the at least one piezoelectric spacer, carry out a control logic and implement corrective actions consisting of the second mechanical vibration emitted by the at least one piezoelectric spacer.

8. A wheel hub assembly for mounting to a knuckle, comprising:
    a bearing unit comprising a radially outer ring, a radially inner ring, and a plurality of rolling bodies disposed between the radially outer ring and the radially inner ring; and
    at least one piezoelectric spacer disposed on a surface of the radially outer ring such that in an assembled condition with the knuckle the at least one piezoelectric spacer contacts a surface of the knuckle,
    wherein,
        the at least one piezoelectric spacer provides a first electric voltage output that is representative of a first mechanical vibration of at least the radially outer ring,
        the at least one piezoelectric spacer receives a second electric voltage input that causes the at least one piezoelectric spacer to generate a second mechanical vibration of about equal amplitude but with opposite direction and phase with respect to the first mechanical vibration, and
        a resultant of the first mechanical vibration and the second mechanical vibration has a resulting amplitude that is close to zero.

* * * * *